United States Patent
Reed et al.

(10) Patent No.: US 11,934,310 B2
(45) Date of Patent: Mar. 19, 2024

(54) ZERO BITS IN L3 TAGS

(71) Applicant: CENTAUR TECHNOLOGY, INC., Austin, TX (US)

(72) Inventors: Douglas Raye Reed, Austin, TX (US); Al Loper, Austin, TX (US); Terry Parks, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 65 days.

(21) Appl. No.: 17/581,162

(22) Filed: Jan. 21, 2022

(65) Prior Publication Data
US 2023/0236972 A1  Jul. 27, 2023

(51) Int. Cl.
*G06F 12/0811* (2016.01)
*G06F 12/0817* (2016.01)
*G06F 12/0853* (2016.01)
*G06F 12/0891* (2016.01)

(52) U.S. Cl.
CPC ...... *G06F 12/0811* (2013.01); *G06F 12/0817* (2013.01); *G06F 12/0853* (2013.01); *G06F 12/0891* (2013.01)

(58) Field of Classification Search
CPC ............. G06F 12/0811; G06F 12/0817; G06F 12/0853; G06F 12/0891
See application file for complete search history.

(56) References Cited

U.S. PATENT DOCUMENTS

| | | | |
|---|---|---|---|
| 10,049,057 B2 | 8/2018 | Desai et al. | |
| 2012/0159077 A1* | 6/2012 | Steely, Jr. | G06F 12/0804 711/E12.044 |
| 2016/0147662 A1* | 5/2016 | Drapala | G06F 12/0806 711/122 |
| 2016/0217080 A1* | 7/2016 | Solihin | G06F 12/0837 |
| 2016/0314069 A1* | 10/2016 | Luttrell | G06F 12/0831 |
| 2020/0301840 A1 | 9/2020 | Reed et al. | |
| 2021/0103460 A1* | 4/2021 | Jalal | G06F 12/0891 |
| 2021/0191865 A1* | 6/2021 | Kalyanasundharam | G06F 12/0815 |

FOREIGN PATENT DOCUMENTS

TW    I739772 B    9/2021

OTHER PUBLICATIONS

NCID: A Non-inclusive Cache, Inclusive Directory Architecture for Flexible and Efficient Cache Hierarchies, by Li Zhao, Ravi Iyer, Srihari Makineni, Don Newell, and Liqun Cheng for Intel® Labs, Intel® Architecture Group, May 2010.

* cited by examiner

*Primary Examiner* — Aracelis Ruiz

(74) *Attorney, Agent, or Firm* — McClure, Qualey & Rodack, LLP

(57) ABSTRACT

In one embodiment, a microprocessor, comprising: plural cores, each of the cores comprising a level 1 (L1) cache and a level 2 (L2) cache; and a shared level 3 (L3) cache comprising plural L3 tag array entries, wherein a first portion of the plural L3 tag array entries is associated with data and a second portion of the plural L3 tag array entries is decoupled from data, wherein each L3 tag array entry comprises tag information and data zero information, the data zero information indicating whether any data associated with the tag information is known to be zero or not.

20 Claims, 4 Drawing Sheets

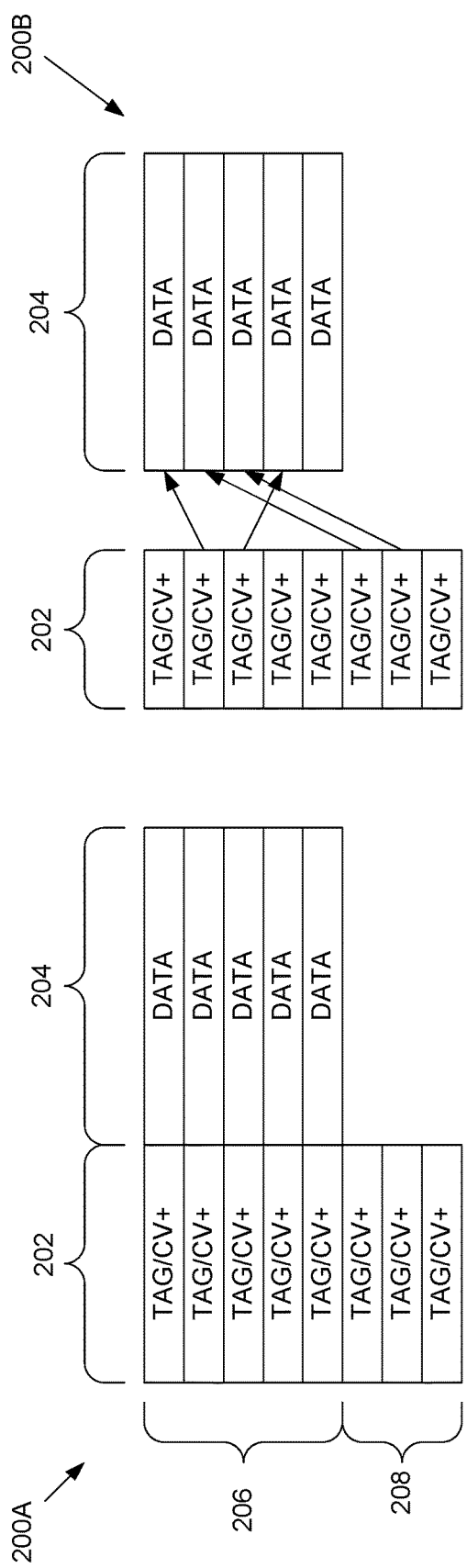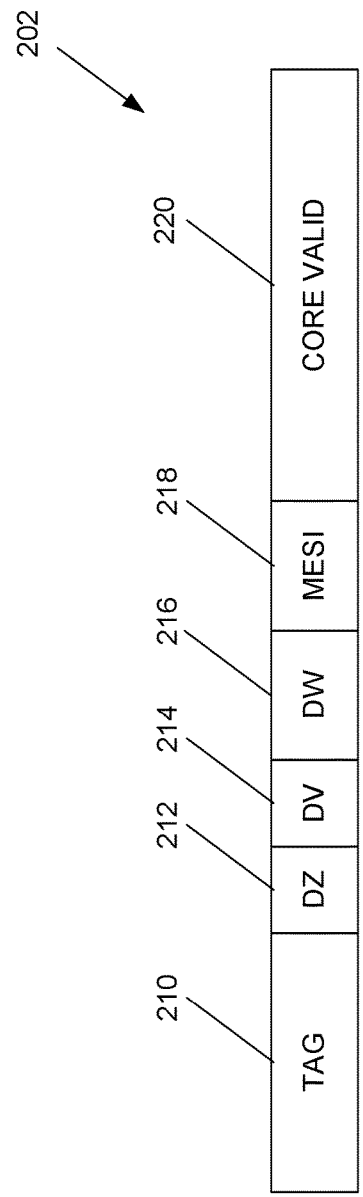

ZERO BITS IN L3 TAGS

TECHNICAL FIELD

The present invention relates in general to cache management, and in particular, last level cache management.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus comprises a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor inefficiently waits idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger and has more storage resources than the L1 cache. Some microprocessors may have a third cache (L3), which may be larger than the L2 cache. The L3 cache is sometimes referred to as a last level cache (LLC), and is a shared cache that is fully accessible and utilized by all cores of a microprocessor.

An important design consideration for multi-level cache hierarchies is the inclusion policy (e.g., inclusive, non-inclusive, exclusive). As is known, an inclusive cache hierarchy (e.g., every cache line in the L2 cache is found in the L3 cache) allows incoming snoops to be filtered at the L3 cache (e.g., not requiring a snoop at the L2 cache if there is a miss in the L3 cache), but at a cost of cache space inefficiency of replicating data (e.g., between L2 and L3 caches). Further, in an inclusive cache hierarchy, eviction of a cache line from the L3 cache requires back-invalidation messages to be sent to the appropriate (e.g., as determined based on core valid bits) L2 cache before the eviction. Non-inclusive caches reduce the need for replication, and evictions from the L3 cache do not require back-invalidations to be sent to the L2 caches. However, one drawback is the need for incoming snoops that miss in the L3 cache to be sent to all of the L2 caches. Exclusive caches benefit from efficient space utilization, though also increases L1-L2 bandwidth for transactions involving bringing in cache lines from L2 cache to L1 (and corresponding writes of L1 contents to the L2 before evictions from the L1 to the L2 cache). For instance, if there is an external snoop coming into the L3 cache (e.g., from a device trying to write the address 1000), then all copies of the address 1000 need to be ejected. The L3 cache needs to send a snoop to every single core in the microprocessor, and if there are many cores (e.g., 64 cores), there is an increased amount of traffic (e.g., on the interconnect).

A cache hierarchy architecture, referred to as a non-inclusive cache, inclusive directory (NCID), has been developed that enables data to be non-inclusive or semi-exclusive or exclusive while maintaining tag inclusion to benefit from snoop filtering capabilities. In general, the NCID architecture decouples at least some tag and data management, where the L3 tag information is inclusive of all L2 tag information, and there exists a larger number of tag/directory array entries (also referred to as tag array entries) than data array entries. For instance, some cache lines in the L2 cache have duplicated tag information in the L3 cache but with no corresponding data in the L3 cache, allowing for tag inclusion and non-inclusive or exclusive data allocation. Note that hereinafter, a main tag/directory array entry (or main tag array entry) is associated with data (a data array entry) and an extended tag/directory array entry (or extended tag array entry) is decoupled from, or has no association with, data (a data array entry). For memory accesses that miss in all levels of the cache hierarchy, the returning data is provided to the L2 cache and can be allocated in the L3 cache via the missing tag/directory array information allocated to the main tag/directory array entry and the data stored in the corresponding data array, or the missing tag/directory array information is allocated to the extended tag/directory array entry with no storage of data in the data array. Evictions from the L3 cache may depend on the circumstances. For instance, if the address being evicted from the L3 cache also has associated data, the data may be evicted while retaining the tag/directory array information. Or, the address being evicted from the L3 cache has no associated data, and thus back-invalidates are generated to the L2 cache, where once the L2 caches have evicted the data, the address eviction is completed at the L3 cache. For incoming snoops, the L3 cache is consulted to find the location of the cache line in one or more L2 caches, and if the cache line does not exist, the request is sent to memory, otherwise, if the cache line exists (with no data existing in the L3 cache), the request is forwarded to an L2 cache with the cached copy. Further information of an NCID architecture may be found in the May 2010 publication of "NCID: A Non-inclusive Cache, Inclusive Directory Architecture for Flexible and Efficient Cache Hierarchies", by Li Zhao, Ravi Iyer, Srihari Makineni, Don Newell, and Liqun Cheng for Intel® Labs, Intel® Architecture Group, incorporated by reference in its entirety.

Though benefits of the NCID architecture are readily apparent, there is still a cost associated with hitting into the L3 cache and not having the data. The more data in the L3 cache, the fewer the queries to another core to get the data back to the requesting core, yet at the cost of more die area for data that is likely to be duplicated. Further, not all data is of equal importance. For instance, zero valued cache line data is a common data value to initialize variables, and further, operating system paradigms are used to zero out large regions of memory. For instance, a common use case occurs when the operating system is anonymizing pages, where basically it is allocating a new region of memory for some application and it wants to zero out all of the contents so that the application cannot infer anything about the previous application that was using that region of memory.

SUMMARY

In one embodiment, a microprocessor, comprising: plural cores, each of the cores comprising a level 1 (L1) cache and a level 2 (L2) cache; and a shared level 3 (L3) cache comprising plural L3 tag array entries, wherein a first portion of the plural L3 tag array entries is associated with data and a second portion of the plural L3 tag array entries is decoupled from data, wherein each L3 tag array entry comprises tag information and data zero information, the data zero information indicating whether any data associated with the tag information is known to be zero or not.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

FIGS. 2A-2B are schematic diagrams that illustrate example data-associated and data-less cache line tag array entries in accordance with certain embodiments of the invention.

FIG. 2C is a schematic diagram that illustrates an embodiment of an example cache line tag array entry.

DETAILED DESCRIPTION

Figure 1:
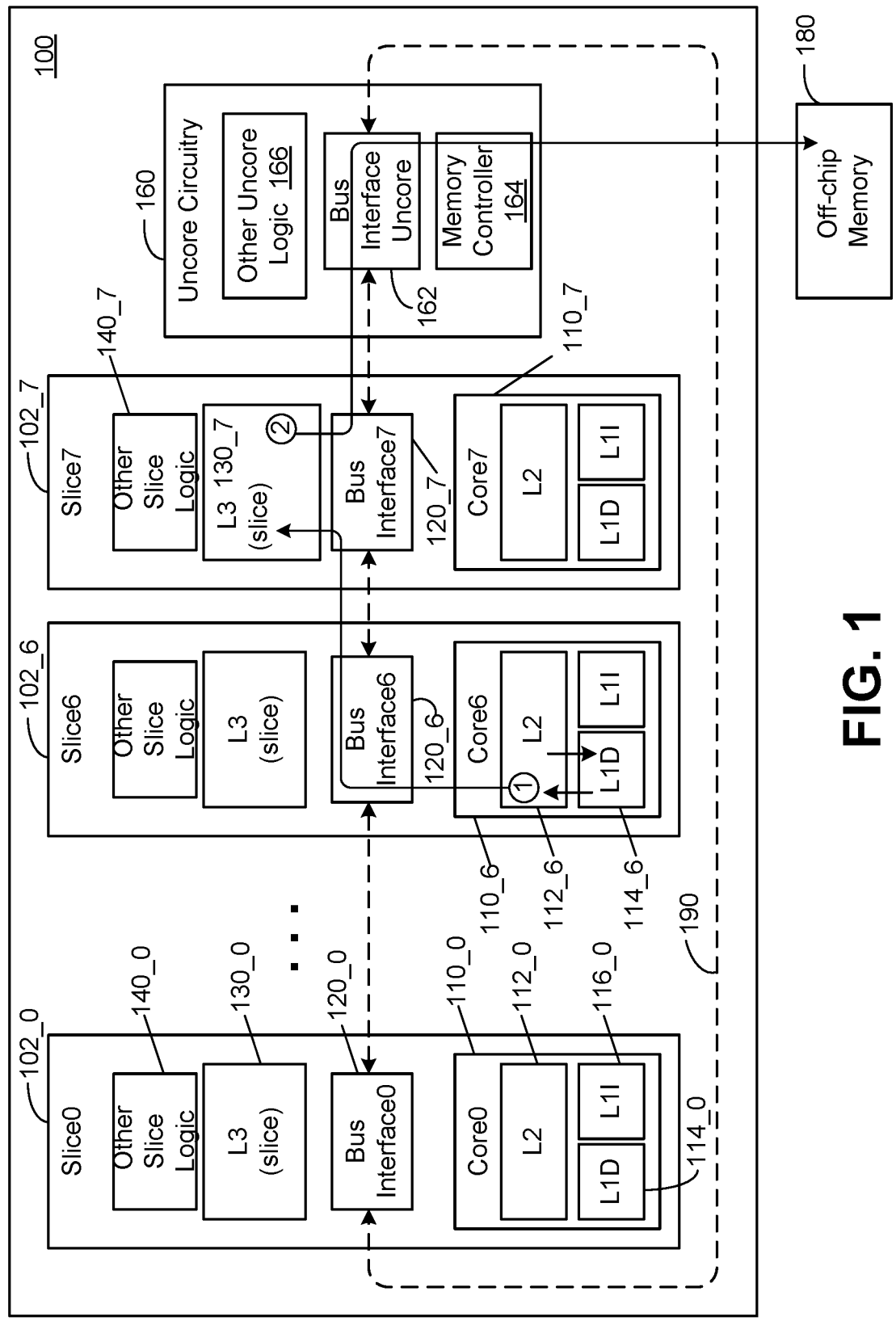
FIG. 1 is a block diagram that illustrates an example microprocessor in which an embodiment of a level-3 (L3) cache management method is implemented.

Certain embodiments of a level-three (L3) cache management method of a multi-core microprocessor, and associated systems and devices, are disclosed that provide an improvement to last level caches (LLC) that are designed according to a non-inclusive cache, inclusive directory (NCID) format. In one embodiment, the L3 cache management method provides for data zero information in each cache line, tag array entry in the L3 cache, which provides an indication of whether data is known to be zero valued or not. In contrast, a typical victim cache (e.g., L3 cache or LLC) requires allocating space in an associated data array to hold cached data when a cache line with data is present. In some embodiments, for cache line tag array entries configured according to ways, when a core of a multi-core microprocessor performs a store or writeback of all zeroes, a non-inclusive LLC may forego allocating data storage for a corresponding way and instead set a bit (the data zero information). If the LLC already has data storage allocated for the cache line, the storage may be deallocated or chosen for reallocation for a later non-zero write. A subsequent read to this cache line in the LLC may forego enabling the data array and/or performing a costly data read while still returning the known-zero data. The LLC may detect zero writes with a NOR reduction of the received data, allowing complete transparency to the core and coherent interconnect without requiring, in some embodiments, any new transaction types or instructions. In some embodiments, zero write detection may be achieved through the introduction of certain transaction types.

Having summarized certain features of an L3 cache management method of the present invention, reference will now be made in detail to the description of an L3 cache management method as illustrated in the drawings. While an L3 cache management method will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" (and similarly with "comprise", "comprising", and "comprises") mean including (comprising), but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons of ordinary skill in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (e.g., VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1 is a block diagram showing an example microprocessor in which an embodiment of an L3 cache management method is implemented. As will be described herein, the present invention is directed to an improvement to NCID cache hierarchy architectures, and in particular, when encountering zero valued data. One example architecture is described below, in which an NCID cache hierarchy architecture may be deployed, and for which an embodiment of an L3 cache management method may be utilized. In this regard, reference is now made to FIG. 1, which is a diagram illustrating a multi-core microprocessor 100. As will be appreciated by persons having ordinary skill in the art from the description provided herein, the present invention may be implemented in a variety of circuit configurations and architectures, and the architecture illustrated in FIG. 1 is merely one of many suitable architectures. Specifically, in the embodiment illustrated in FIG. 1, the microprocessor 100 is an eight-core processor, wherein the cores are enumerated core0 110_0 through core7 110_7. In the illustrated embodiment, numerous circuit components and details are omitted, which are not germane to an understanding of the present invention. As will be appreciated by persons having ordinary skill in the art, each processing core (110_0 through 110_7) includes certain associated or companion circuitry that is replicated throughout the microprocessor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level-one (L1) cache, a level-two (L2) cache, and a level-three (L3) cache configured according to NCID. The L1 cache is separated into both a data cache and an instruction cache, respectively denoted a L1D and L1I. The L2 cache also resides on core, meaning that both the L1 cache and the L2 cache are in the same circuitry as the core of each slice. In one embodiment, each core L2 is inclusive of that core L1, though in some embodiments, may be partially inclusive. Each core of each slice has its own dedicated L1D, L1I, and L2 caches. Outside of the core, but within each slice is a shared L3 cache (e.g., shared by all cores). In one embodiment, the L3 cache 130_0 through 130_7 (also collectively referred to herein as 130) is a distributed cache, meaning that 1/8th of the L3 cache resides in slice0 102_0, 1/8th of the L3 cache resides in slice1 102_1, etc. In one embodiment, each L1 cache is 32 k in size, each L2 cache is 256 k in size, and each slice of the L3 cache is 2 megabytes in size. Thus, the total size of the L3 cache is 16 megabytes. Note that other individual or aggregate cache sizes may be used in some embodiments. Note that the L3 cache may be considered as comprising data-less ways (populated on core requests that miss in the L3 cache) and data-containing ways (e.g., populated on core writebacks of clean or dirty data), where the data-containing ways and data-less ways are mutually exclusive in some embodiments (e.g., a cache line may be resident in one or the other, but not both).

Bus interface logic 120_0 through 120_7 is provided in each slice to manage communications from the various circuit components among the different slices. As illustrated in FIG. 1, a communication bus is 190 is utilized to allow communications among the various circuit slices, as well as with uncore circuitry 160. The communication bus and bus interface logic may be referred to as an interconnect (e.g., a 2D mesh). The uncore circuitry 160 merely denotes additional circuitry that is on the processor chip, but is not part of the core circuitry associated with each slice. As with each illustrated slice, the un-core circuitry 160 includes a bus interface circuit 162. Also illustrated is a memory controller 164 for interfacing with off-processor (off-chip) memory 180 (e.g., DRAM). Finally, other un-core logic 166 is broadly denoted by a block, which represents other circuitry that may be included as a part of the un-core processor circuitry (and again, which need not be described for an understanding of the invention).

To better illustrate certain inter and intra communications of some of the circuit components, the following example will be presented. This example illustrates communications associated with a hypothetical load miss in core6 cache. That is, this hypothetical assumes that the processing core6 110_6 is executing code that requests a load for data at hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three-bit address (sufficient to identify which slice—slice 0 through slice 7—the data is stored in).

In keeping with the example, assume this hashing function results in an indication that the data, if present in the L3 cache, would be present in that portion of the L3 cache residing in slice7. A communication is then made from the L2 cache of slice6 102_6 through bus interfaces 120_6 and 120_7 to the L3 cache present in slice7 102_7. This communication is denoted in the figure by the encircled number 1. If the data was present in the L3 cache, then it would be communicated back from the L3 cache 130_7 to the L2 cache 112_6. However, and in this example, assume that the data is not in the L3 cache either, resulting in a cache miss. Consequently, a communication is made from the L3 cache 130_7 through bus interface7 120_7 through the un-core bus interface 162 to the off-chip memory 180, through the memory controller 164. This communication is denoted in the figure by the encircled number 2. A cache line that includes the data residing at address 1000 is then communicated from the off-chip memory 180 back through memory controller 164 and un-core bus interface 162 into the L2 cache of slice6 (the requesting core). The allocation to the L3 cache 130 for such a memory access, or for eviction or incoming snoops, is known and described above for NCID architectures in general, and is omitted here for brevity except as noted otherwise below.

Note that, with regard to a cache line of each of the L1 caches, in one embodiment the cache line is 64 bytes. Thus, 64 bytes of load data can be loaded per clock cycle. As mentioned above, in one embodiment, the L2 cache is preferably 256 KB in size.

Attention is now directed to FIGS. 2A-2B, which illustrate example data-associated and data-less cache line tag array entries in accordance with certain embodiments of the invention. FIG. 2A shows a static array 200A comprising cache line tag array entries 202 (denoted tag and core valid plus or tag/cv+, which symbolically suggests a hashed address tag information, core valid information, and additional meta data as described below in association with FIG. 2C) and data array entries 204. In one embodiment, each data array entry comprises 64 bytes, though other values may be used in some embodiments. In this simple example embodiment shown in FIG. 2A, the static array 200A comprises (for each L3 cache of each slice) an eight (8) way tag array, with five (5) ways 206 of the cache line tag array entries 202 (simply referred to hereinafter as tag array entries or collectively, a directory) predetermined as associated with five (5) data array entries 204, and three (3) ways 208 of the tag array entries 202 comprising data-less tag arrays (e.g., decoupled from a respective data array). In other words, in this example, ways 0-4 (indexing from top down in FIG. 2A) have data associated with them, and ways 5-7 do not have associated data (data-less). Accordingly, there are instances where an access into the L3 cache hits the tag array or directory (e.g., for ways 208) but there is no corresponding data storage, resulting in the need to obtain the data from another core (e.g., based on core valid information as explained below).

In effect, the NCID approach only maintains data in the L3 cache where it is not also resident in one of the cores, yet enables tracking (through the inclusive directory or tag array) of the data without bringing the data into the L3 cache. Any cache line in the L2 caches anywhere in the microprocessor is tracked via the L3 tag array 202, but not necessarily with data storage allocated to it in the L3 cache. Note that the quantity of ways and/or tag and/or data entries is merely an illustrative example, and other quantities may be used in some embodiments. For instance, in some embodiments, each L3 slice is organized into 4096 sets×17 ways, where ways 0-7 have data storage associated with them, and ways 8-16 are data-less (e.g., L3 tag arrays comprising ways 0-16, where L3 data array comprises, from among ways 0-16, ways 0-7). An example static scheme is also described in the NCID article, and hence further discussion is omitted here for brevity.

FIG. 2B shows a dynamic array 200B that similarly comprises an eight (8) way tag array 202, except any given way of the tag array 202 may be associated with a data array 204 (e.g., five of them) as required at run-time and according to a (data way) pointer (represented by the arrows in FIG. 2B) maintained in the tag array entries 202. In this scheme, instead of treating directory ways and data ways as separate and predetermined tag array ways and data ways, respectively, the dynamic array 200B is considered as having, in this example, eight (8) ways, with each way having a bit indicating whether data is associated with it (e.g., a data valid bit), and if so (e.g., data valid bit is set to 1), a 3-bit pointer (of the data ways information) is used to indicate which of the data array entries corresponds to the tag entry way. An example dynamic scheme is also described in the NCID article, and hence further discussion is omitted here for brevity. Note that in some embodiments, the tag array may be an extended tag array (e.g., data-less) used in conjunction with a main tag array (with associated data) in the L3 cache as also described in the NCID article. Note that in some embodiments, ways may refer to tag array entry ways or data array entry ways.

Referring now to FIG. 2C, shown is an embodiment of an example tag array entry 202 (e.g., one of the tag/cv+ entries 202 among the plurality of tag array entries 202 or directory in FIG. 2A) that may be associated with a data array or decoupled from a data array. The tag array entry 202 comprises plural information or fields, including (from left to right in FIG. 2C) tag information 210, data zero information 212, data valid information 214, data way information 216, MESI information 218 (from the known invalidate based cache coherence protocol, MESI, including the four exclusive states of modified, exclusive, shared, and invalid), and core valid information 220. The tag information 210 comprises higher order bits of the address (e.g., hashed to ensure uniform use of, for instance, the plural L3 cache banks).

The data zero information 212 comprises an indication of whether data is known to be zero or not. In one embodiment, the data zero information 212 consists of a single bit, where a bit setting of 1 signifies that data is known to be zero, and a bit setting of 0 signifies generally that the data is not known to be zero. As to the latter condition, the data valid information 214 (e.g., bit) is assessed for data access, where data valid information 214 in one embodiment is set to 1 if the data ways is valid, and set to 0 if there is no assigned data way. Note that when data zero information 212 is set, one result is that there is no need to interrogate or access the data way information 216 or data valid information 214 to try to read data out of the L3 cache. In other words, there is no need to access data from another core because now it is known that the data is zero-valued, and so zeroes may be returned without additional array access processing.

Explaining the data zero information 212 further, in one embodiment, if the data zero information 212 is set to 1, the data is known to be zero (zero valued), whether stored in the L3 data array or not. With the knowledge that the data value is zero, there is no need to perform any array access nor is there any need to consult another core. Instead, zeroes are returned directly. If the data zero information 212 is equal to zero, then the data valid information 214 is assessed to determine if data is available as explained further below.

Digressing briefly, the determination that data is known to be zero is achieved according to one of several techniques/methods. Perhaps the simplest method does not require any new transaction types or new instructions or any operating system support. In one embodiment, any time data is written into the L3 cache (e.g., when modified data is evicted from an L2 cache or L3 cache, or any time data is brought into the L3 cache from system memory), L3 cache logic compares the cache line content to zero in what is often referred to as a NOR reduction. If zero, then instead of writing the data into the data array or, ideally, instead of evicting useful data from the data array, the bit (e.g., data zero information 212) is set indicating that the data is (known to be) zero. This method is completely transparent to the rest of the microprocessor, where no logic outside of the L3 cache needs to be aware of this data zero technique. Simply stated, when data comes in, it is determined that the data is zero and the data zero bit is set, and storage is allocated for data that comes in and is non-zero.

In some embodiments, the determination that data is known to be zero may be achieved via a new transaction type. For instance, in embodiments where the L3 cache is distributed across an interconnect (e.g., non-uniform cache access or NUCA, as opposed to a monolithic L3 cache), a new transaction type may be generated by the core on the interconnect by explicitly writing zeroes over the cache line (e.g., such as for anonymizing pages by the operating system). Hardware in the L1D cache may be used to detect the writing of zeroes, or a new x86 instruction may be executed by the core that zeroes the cache line. In other words, the interconnect transaction may be generated by a new x86 instruction, or an x86 instruction may be generated to write 64 bytes all at once. Special logic may be used that generates the new transaction that corresponds to this specific variant of the x86 instruction, based on the need or desire to zero out a cache line.

In some embodiments, the determination that data is known to be zero is achieved via use of the repeat new string instruction that the operating system may use to zero out regions of memory. For instance, special support in microcode for the repeat new string enables zeroing out entire cache lines. As an illustration, by generating a new transaction on the interconnect, instead of the transaction requesting that core0 is to store to a cache line, the transaction requests that core0 is to zero out the cache line. Further, instead of returning data, a directory bit setting is set to 1.

Continuing with the description for FIG. 2C, the data valid information 214, when set, also means that the data way information 216 is valid. If not set (e.g., zero), the data valid information 214 signifies that the data has to be accessed from another core (e.g., using the core valid information 220 to find the appropriate core(s)). The data way information 216 signifies whether there is associated data (data ways) available in the L3 cache, and as explained above, comprises a 3-bit pointer that is used to indicate which of the data array entries corresponds to the tag entry way. The MESI information 218 and core valid information 220 indicates, respectively, the known MESI state and the potential presence of a cache line in the core's private L1/L2 cache. For instance, in one embodiment (e.g., for a 64 core microprocessor), there is a bit setting associated with each core to indicate whether the particular core has the cache line requested or not. In general, the number of per core valid bits increases linearly with the maximum core count supported by the L3 cache, and the tag bits increases linearly with the physical address width for a given L3 slice capacity and associativity. In one embodiment, and assuming a 64 core microprocessor with eight (8) data ways (e.g., a 4096 set×17 ways, where 4096 implies 12 bits of set index, and set indices are bits 17:6 of the physical address, so for a 46-bit physical address, 45−17=28 bit tag is implied), each tag array entry 202 comprises 64-bit core valid information 220, 2-bit L3 MESI information 218, 3-bit data way information 216, 1-bit data (way) valid information 214, 1-bit data zero information 212, and 28-bit tag information 210. In some embodiments, other schemes may be used. For instance, if non-power-of-2 number of data ways are implemented, the data valid information 214 may be omitted and the no-data state information may be encoded in the data way information 216.

Figure 3:
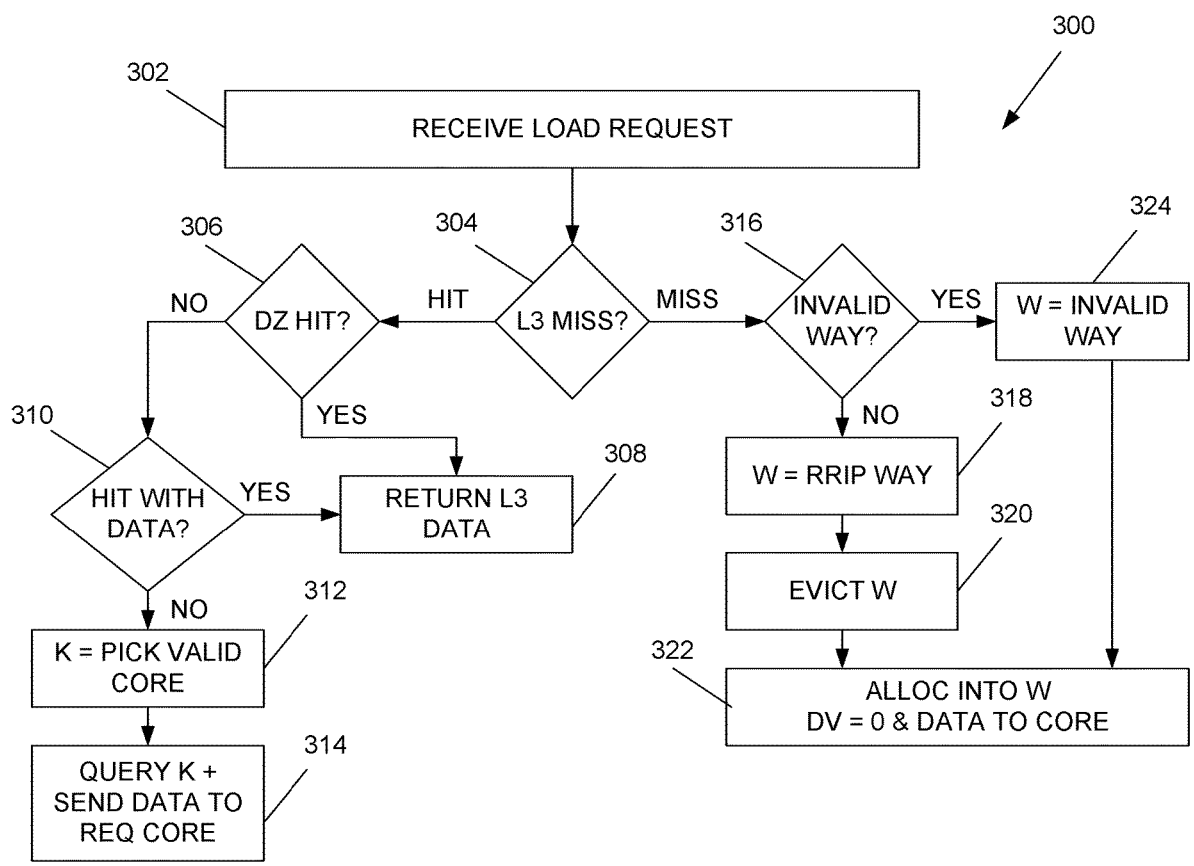
FIG. 3 is a flow diagram that illustrates an embodiment of an example L3 cache management method.

Having describe the directory structure (e.g., NCID cache tag array format) of certain embodiments of an L3 cache management method, attention is directed to FIG. 3, which illustrates an embodiment of an example L3 cache management method 300 (e.g., implemented in the L3 cache, such as via a control unit (e.g., state machines), cache controller, among other logic). In block 302, the method receives a load request. For instance, when the L2 cache receives a load request from an L1, it consults its local directory to determine if the cache line is resident in the L2 with sufficient MESI to satisfy the load request. If the cache line is not in the L2 cache, the request is said to miss and will be forwarded to the L3 cache selected by the hash of the physical address. When an L2 miss goes to the L3 cache, the L3 cache consults its tag array structure (with and without an associated data array), where the load may miss in the L3, or hit in the L3 in a data-less or data-containing way, and where the data zero information is consulted first to avoid needless array accesses.

In block 304, the method determines whether the load request hits in the L3 cache (e.g., hits in an L3 tag array or directory). If so ("hit"), the method 300 determines at block 306 whether there is a hit to the data zero information (bit setting equal to 1). If so ("Yes"), the method returns the L3 data as zeroes at block 308 without any array accesses. If not ("No" at block 306), the method 300 determines at block 310 whether there is a hit of the data valid information (e.g., does this cache line have data associated with it). If so ("Yes"), this means the location of the directory/tag array (entry) that is hit in has an associated data valid set, and thus the data way pointer is read and used to select which way the data is in to return in block 308. Note that the cache hit may be in the tag array in, say, way0 of the L3 cache, and the data may be in way6 in the L3 cache. In short, if the data valid bit is set in the tag array, that means that there is data resident in the L3 cache.

If the method 300 determines no at block 310 (no hit with data), the cache line of the load request is being tracked by the L3 cache but the data is not physically present inside the L3 cache. In other words, there is a tag array that tracks the cache line but has no data array associated with it (a data-less way), and so a core is chosen to query and to instruct this core to forward data to the requesting core (and demoting the MESI state) as described in blocks 312 and 314. In particular, at block 312, the method 300 chooses a valid core, K, containing the cache line to query (e.g., from the core valid information). In one embodiment, the choice of core may be via random selection of a valid core. In some embodiments, K may be a node identifier of the closest core, such as based on a priori knowledge of the organization of the node identifiers of the cores. For instance, with a 64 core microprocessor, there may be eight rows and eight columns and cores 0-7 comprise the first column, cores 8-15 comprise the second column, and so forth up through core63. Accordingly, if core1 is performing a request to this cache line, and core2 and core63 each have this cache line, then core2 may be chosen to fulfill this request based on being physically adjacent to the requesting core as indicated by the node identifier, K. Then, in block 314, the core comprising the node identifier is queried and the data from that core is sent to the requesting core.

If the method 300 determines a miss (in the tag array or directory) at block 304, blocks 316-324 are generally known, and attempt to bring a cache line into the cache hierarchy (e.g., from system memory or DRAM) that does not currently exist anywhere in the cache hierarchy (i.e., a totally new line). In block 316, the method 300 determines whether an invalid way exists, as there is a preference to allocate into an invalid way. If not ("No" to block 316), this means all ways are valid, and hence a way (W) is chosen via re-reference interval prediction or RRIP at block 318 (or other technique in some embodiments) and used at block 320 to evict the chosen way. At block 322, the method 300 allocates into the way and sets the data valid to zero and the data is sent to the requesting core. If the method 300 determines there is an invalid way ("Yes" at block 316), that way is selected at block 324 and allocation and data to the core occurs as described above for block 322. In effect, a way is chosen to allocate into the L3 cache, evict the cache line, and update the tag array to reflect the fact that the L3 cache is now tracking the new cache line.

Figure 4:
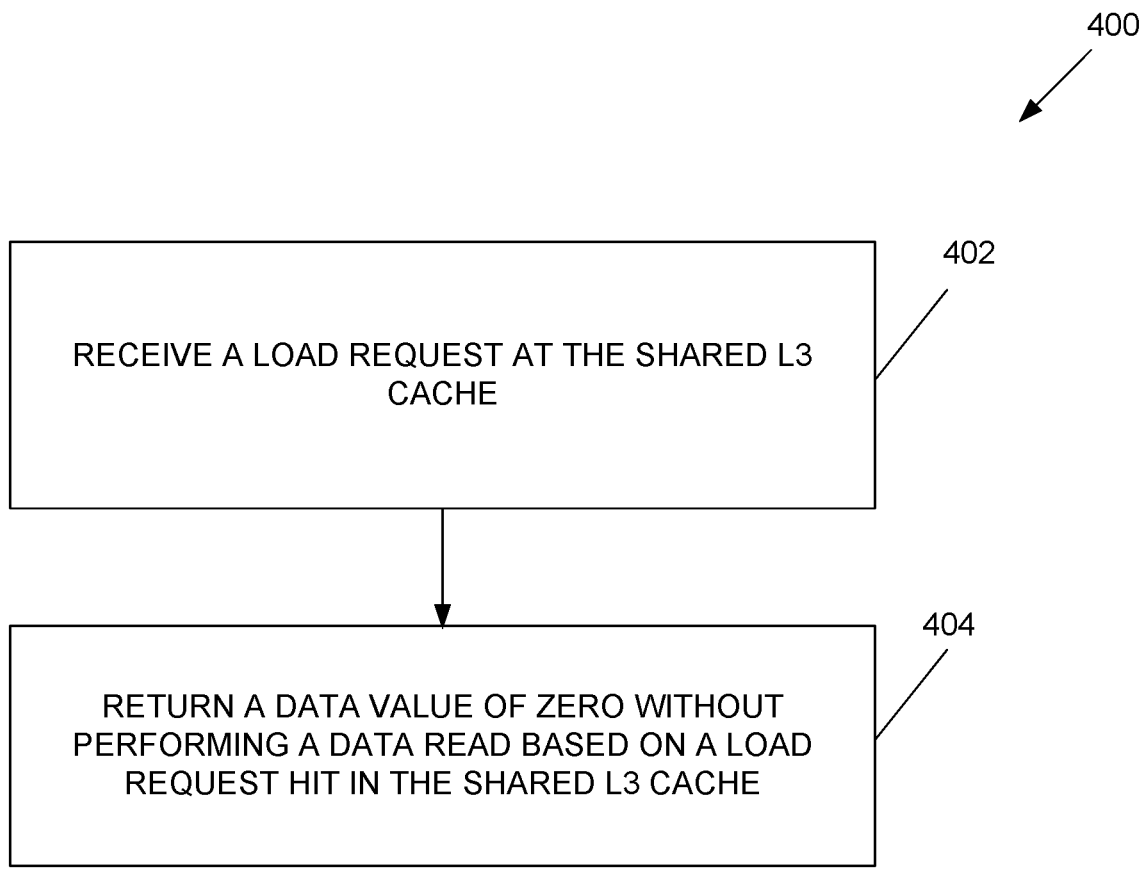
FIG. 4 is a flow diagram that illustrates another embodiment of an example L3 cache management method.

In view of the above description, it should be appreciated by one having ordinary skill in the art that one embodiment of a method for handling zero valued data in a microprocessor comprising plural cores, each of the cores comprising a level 1 (L1) cache and a level 2 (L2) cache, the microprocessor further comprising a shared level 3 (L3) cache comprising plural L3 tag array entries, each of the plural L3 tag array entries comprising tag information, wherein a first portion (e.g., data containing ways) of the plural L3 tag array entries is associated with data and a second portion (e.g., data-less ways) of the plural L3 tag array entries is decoupled from data, the method, described in FIG. 4 and denoted as method 400, comprising: receiving a load request at the shared L3 cache (402); and returning a data value of zero without performing a data read based on a load request hit in the shared L3 cache (404).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, or one or more of the blocks may be omitted, depending on the functionality involved, as would be understood by those reasonably skilled in the art of the present disclosure. For instance, the method 400 in FIG. 4 may be performed by the microprocessor (e.g., the L3 cache). In some embodiments, the method 400 may be performed using a control unit or a cache management controller.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

The invention claimed is:

1. A microprocessor, comprising:
plural cores, each of the cores comprising a level 1 (L1) cache and a level 2 (L2) cache; and
a shared level 3 (L3) cache comprising plural L3 tag array entries, wherein a first portion of the plural L3 tag array entries is associated with data in the shared L3 cache and a second portion of the plural L3 tag array entries is decoupled from data in the shared L3 cache and available in the L2 cache of one of the plural cores, wherein each L3 tag array entry comprises tag information and data zero information, the data zero information indicating whether any data associated with the tag information is known to be zero or not.

2. The microprocessor of claim 1, wherein based on a load request hit in the shared L3 cache and the data zero information indicating that the data associated with the tag information is known to be zero, the shared L3 cache is configured to return a data value of zero without performing a data read.

3. The microprocessor of claim 1, wherein each L3 tag array entry further comprises MESI information, core valid information, and one or a combination of data way information or data valid information, wherein based on a load request hit in the shared L3 cache and the data zero information not indicating that the data associated with the tag information is known to be zero, the shared L3 cache is configured to determine whether non-zero data is associated with the tag information or not.

4. The microprocessor of claim 3, wherein based on determining that non-zero data is associated with the tag information, the shared L3 cache is configured to return the non-zero data.

5. The microprocessor of claim 3, wherein determining whether non-zero data is associated with the tag information or not is based on an assessment of the data way information or the data valid information.

6. The microprocessor of claim 3, wherein based on determining that non-zero data is not associated with the tag information, the shared L3 cache is configured to determine at least one of the plural cores to satisfy the load request.

7. The microprocessor of claim 1, wherein based on a load request miss in the shared L3 cache, allocating into an invalid way or evicting a way.

8. The microprocessor of claim 1, wherein the shared L3 cache comprises a non-inclusive cache, inclusive directory arrangement.

9. The microprocessor of claim 1, wherein the plural L3 tag array entries correspond to plural ways, and wherein based on one of the plural cores performing a store or writeback of all zeroes, the shared L3 cache is configured to forego allocating data storage for a corresponding way and instead set a bit of the data zero information.

10. The microprocessor of claim 1, wherein the data zero information consists of a single bit.

11. A method for handling zero valued data in a microprocessor comprising plural cores, each of the cores comprising a level 1 (L1) cache and a level 2 (L2) cache, the microprocessor further comprising a shared level 3 (L3) cache comprising plural L3 tag array entries, each of the plural L3 tag array entries comprising tag information, wherein a first portion of the plural L3 tag array entries is associated with data in the shared L3 cache and a second portion of the plural L3 tag array entries is decoupled from data in the shared L3 cache and available in the L2 cache of one of the plural cores, the method comprising:

receiving a load request at the shared L3 cache; and returning a data value of zero without performing a data read based on a load request hit in the shared L3 cache.

12. The method of claim 11, wherein returning a data value of zero is based on data zero information of one of the plural L3 tag entries indicating that the data associated with the tag information is known to be zero.

13. The method of claim 12, wherein each of the plural L3 tag array entries further comprises MESI information, core valid information, and one or a combination of data way information or data valid information, wherein based on a load request hit in the shared L3 cache and the data zero information not indicating that the data associated with the tag information is known to be zero, determining whether non-zero data is associated with the tag information or not.

14. The method of claim 13, wherein based on determining that non-zero data is associated with the tag information, returning the non-zero data.

15. The method of claim 13, wherein determining whether non-zero data is associated with the tag information or not is based on an assessing the data way information or the data valid information.

16. The method of claim 13, wherein based on determining that non-zero data is not associated with the tag information, determining at least one of the plural cores to satisfy the load request.

17. The method of claim 12, wherein the data zero information consists of a single bit.

18. The method of claim 12, wherein the plural L3 tag array entries correspond to plural ways, and wherein based on one of the plural cores performing a store or writeback of all zeroes, forego allocating data storage for a corresponding way and instead setting a bit of the data zero information.

19. The method of claim 11, further comprising allocating into an invalid way or evicting a way based on a load request miss in the shared L3 cache.

20. The method of claim 11, wherein the shared L3 cache comprises a non-inclusive cache, inclusive directory arrangement.

\* \* \* \* \*